United States Patent [19]
Lasswell et al.

[11] 4,348,235
[45] Sep. 7, 1982

[54] STOP-LEAK COMPOSITION FOR AUTOMOBILE COOLING SYSTEMS AND THE LIKE

[75] Inventors: Tull C. Lasswell; John L. Monier, both of Oxford, Mich.

[73] Assignee: Tri-X Corporation, Oxford, Mich.

[21] Appl. No.: 163,818

[22] Filed: Jun. 27, 1980

[51] Int. Cl.³ .............................................. C09K 3/12
[52] U.S. Cl. .................................... 106/33; 264/122; 106/123 LC
[58] Field of Search ...................... 106/33, 38.24, 123; 264/122 LC

[56] References Cited

U.S. PATENT DOCUMENTS 2,576,386  11/1951  Bird ...................................... 210/698
2,580,719  1/1952   Barton ................................... 106/33
3,322,548  5/1967   Lasswell et al. ....................... 106/33

OTHER PUBLICATIONS

Chem. Abst. 75:57639t 1971.

Primary Examiner—Theodore Morris
Attorney, Agent, or Firm—Hauke and Patalidis

[57] ABSTRACT

A stop-leak composition for an internal combustion cooling system, hot water heating systems and the like consisting essentially of ginger rhizome flour, ground nut shells, boric acid, sodium lignin sulfonate and magnesium stearate.

6 Claims, No Drawings

STOP-LEAK COMPOSITION FOR AUTOMOBILE COOLING SYSTEMS AND THE LIKE

BACKGROUND OF THE INVENTION

The invention relates in general to a stop-leak composition and, more particularly, the invention relates to a stop-leak composition particularly adapted for use in the cooling systems of internal combustion engines and hot water heating systems, although not necessarily limited thereto.

Stop-leak compositions found in the prior art generally consist essentially of a starchy paste such as corn starch, cereal flours and the like, mixed with a powdered metal, such as aluminum, or with powdered graphite. Some compositions also contain rosins or gums, and may include in addition a small quantity of soluble oil or soap.

Such compositions function on the theory of forming a film or coating over the leaks in, for example, internal combustion engine cooling systems. Such a film or coating is generally not of a permanent nature, so that the leak may reappear after a short time, with the result that repeated treatments of the cooling system are required. Other compositions containing a soluble oil or soap have a tendency to coat the surfaces exposed to the flow of coolant or heating fluid with an oily film, so that the stop-leak ingredients in the composition are somewhat prevented from strongly adhering to the surfaces proximate a leak, and the oily film thus formed is detrimental to proper heat transfer between the cooling system internal surfaces and the coolant fluid circulating through the cooling system.

The present invention, which is an improvement of prior U.S. Letters Patent No. 3,322,548, issued May 30, 1967, provides an improved stop-leak composition which avoids most of the shortcomings of prior art stop-leak compositions, and which further acts as an efficient rust preventer without the addition of any oil or soap to the composition, which provides a permanent seal for any hole or crack in a cooling or heating system, and which is compatible with all known types of anti-freeze compositions.

The improved stop-leak composition of the present invention presents the advantage over the stop-leak compositions disclosed and claimed in the aforesaid prior Letters Patent of providing a mixed powder which is less subject to being influenced by atmospheric humidity prior to compacting in a compacting press or pelletizing apparatus, which flows better into the compacting dies without sticking and which, after compacting in the form of dried pellets or pills, is substantially harder and thus less subject to dusting and breakage during packaging or during transportation in bulk. The improved stop-leak composition of the present invention provides better lubrication of the compacting punches and dies than the composition disclosed and claimed in the aforesaid patent, improved unmolding from the die and, in use, it has been found to dissolve more rapidly in a liquid fluid such as water and to provide an improved dispersion and suspension of the ingredients in the coolant of an internal combustion engine or in the heat transferring fluid of a heating system.

SUMMARY OF THE INVENTION

The principal objects of the invention are to provide an improved novel stop-leak composition, more particularly for internal combustion engine cooling systems, but also for hot water heating systems or any system utilizing a liquid fluid, such as water, circulating in a closed loop circuit, which produces a permanent seal, which inhibits the formation of rust and corrosion within a cooling or heating system, and which provides appropriate lubrication for circulation pumps, without any of the inconveniences resulting from the use of an oily stop-leak composition.

Further objects of the invention are to provide an improved stop-leak composition which does not deteriorate with time, which has no deleterious action on metal or rubber, which is compatible with all known anti-freeze solutions, which is available in a dry form such as a small size pill or pellet capable of treating a substantial volume of coolant or heating fluid, which does not clog restricted passages in a cooling or heating system, which dissolves almost immediately in cold as well as hot water, which is capable of sealing substantially large cracks or holes, which does not form any sludge in a cooling or heating system and which may be readily prepared from substantially cheap ingredients readily obtainable on the market.

Further objects and advantages of the invention will become apparent when the following description of a preferred embodiment, which is given for illustrative purposes only, is considered together with the method of preparing the same and the claims appended hereto.

DETAILED DESCRIPTION OF THE PREFERRED EMBODIMENTS

In the preparation of a stop-leak composition according to the invention, hardwood nut shells, such as almond shells, pecan shells and the like, are finely ground in a hammermill until the nut shell powder thus obtained is capable of passing through a No. 30 mesh screen. Ginger rhizomes are also ground in a separate hammermill until the resulting ginger rhizome flour is capable of passing through a No. 30 mesh screen.

The ground hardwood shell powder and the ginger rhizome flour are then mixed, or blent, in a ribbon mixer for approximately five minutes. About 20 to 50% by weight of ground hardwood nut shell powder is mixed to 50 to 75% by weight of ginger rhizome flour.

To the mixture of ground and screened hardwood nut shell powder and ginger rhizome flour are added binder and lubricant agents consisting of boric acid powder, about 1.5 to 3.5% by weight, magnesium stearate, about 0.5 to 2% by weight, and Orzan S, about 3 to 6% by weight, and the blend is thoroughly mixed for another 2 to 3 minutes.

Orzan S is a trademark of Crown Zellerbach, Chemical Products Division, Camas, Wash. 98607. It is available in the form of a free-flowing, light brown spray-dried powder and is essentially sodium lignin sulfonate containing traces of wood sugars.

The mixture of ingredients is then fed to a continuously rotating pellet making machine in which the ingredients are compacted in individual pellets under a pressure of at least 2 tons per square inch (140 kg/cm$^2$) and preferably between 20 tons per square inch (1,400 kg/cm$^2$) and 40 tons per square inch (2,800 kg/cm$^2$).

The finished product, in the form of a pellet, substantially 25 mm. in diameter by 15 mm. in height, and weighing substantially from nine to ten grams, has been found sufficient for treating 12 to 16 liters of coolant or heat transfer fluid. Consequently, one such pellet is sufficient for a compact automobile, while two pellets or pills are preferably used in large size, formerly so-called standard, automobiles.

The Orzan S, the boric acid and the magnesium stearate together provide an effective binder for the pulverized ingredient mixed powders after compacting in the form of a dried pellet. The magnesium stearate, in addition, contributes to facilitating mold release and promoting good flow characteristics to the powders with which it is mixed, even though such powders may be somewhat hygroscopic. The boric acid, in addition to also forming an effective binder, acts as a dry lubricant for the compacting punches and dies and helps in eliminating formation of rust and corrosion in internal combustion cooling systems and in hot water heating systems. The action of the Orzan S ingredient is that of a strong binding agent for the powder particles which also contributes to lubrication of the punches and dies, minimizes dusting or breakage of the compacted pellets, and improves the flow properties of the finely divided solid particles in suspension in the coolant or heating fluid in view of the characteristics of Orzan S as a dispersant or surface active agent.

The range of ingredients, in percent by weight, which has been found suitable for the stop-leak composition according to the present invention is tabulated in the following table:

TABLE

| Ginger rhizome flour | 50–75 |
|---|---|
| Orzan S | 3–6 |
| Boric acid | 1.5–3.5 |
| Magnesium stearate | 0.5–2 |
| Ground nut shells | Balance |

Specific examples of stop-leak compositions within the scope of the present invention are given hereinafter:

Example 1

| Ginger rhizome flour | 70% by weight |
|---|---|
| Ground nut shells | 24% by weight |
| Orzan S | 3% by weight |
| Boric acid | 2% by weight |
| Magnesium stearate | 1% by weight |
| | 100 |

Example 2

| Ginger rhizome flour | 67% by weight |
|---|---|
| Ground nut shells | 25% by weight |
| Orzan S | 5% by weight |
| Boric acid | 2.5% by weight |
| Magnesium stearate | 0.5% by weight |
| | 100 |

Example 3

| Ginger rhizome flour | 55% by weight |
|---|---|
| Ground nut shells | 34% by weight |
| Orzan S | 5.5% by weight |
| Boric acid | 3.5% by weight |
| Magnesium stearate | 2% by weight |
| | 100 |

Example 4

| Ginger rhizome flour | 62% by weight |
|---|---|
| Ground nut shells | 30% by weight |
| Orzan S | 4.5% by weight |
| Boric acid | 2.5% by weight |
| Magnesium stearate | 1% by weight |
| | 100 |

Example 2 and Example 4 are preferred average compositions for universal use in internal combustion engine cooling systems, as providing best over-all combined leakage prevention, leakage heating and rust inhibition characteristics under the normal conditions encountered in such systems. Example 3 provides a hard pellet highly resistant to dusting and breakage and having high corrosion inhibition and scouring properties, while Example 1 provides best leakage prevention and healing characteristics.

Pellets made according to the invention have been found to be an effective cooling or heating system sealant capable of sealing not only tiny pin holes and narrow cracks but also holes as large as 0.8 mm and more. The mixture of ingredients penetrates inside the hole or crack and rapidly turns into a plastic-like permanent seal strongly adhering to the metal or rubber material of the lips of the crack. The plastic-like permanent seal is so strong that it cannot be dislodged by the flow of liquid fluid in the system, and can withstand fluid pressures as high as 40 psi while sealing relatively large cracks and holes, and higher fluid pressure while sealing relatively small pin holes and narrow cracks. As long as the coolant has sealant particles in suspension therein, the particles seek out and seal any new leak that may develop. Furthermore, the fine particles of the ingredients in the composition of the invention have a softening action upon the internal surfaces of the cooling system, thus inhibiting the formation of rust and corrosion. In addition, the circulation pumps are kept properly lubricated by the non-oily lubricating action of the ingredients, such non-oily lubricating action avoiding the formation of an oily film on the internal surface, which is detrimental to heat transfer and which has a deleterious effect on the adhesion qualities of any stop-leak composition.

The pellets made according to the teachings of the invention dissolve almost immediately in the liquid fluid into very fine particles that do not clog radiator cores or heat exchangers and that remain constantly in suspension in the liquid fluid, as long as such liquid fluid, coolant or heat transfer fluid, is occasionally circulating, thus avoiding the formation of sludge deposits at the lower or stagnant portions of the system.

Although the stop-leak composition of the invention is preferably supplied to the user in the form of compacted dry pellets, it is readily apparent that the mixed powders may also be used in bulk in their original particulate form, using an average dosage of about 10 grams of mixed powders per 12 to 16 liters of liquid fluid in the system to be treated for best average results.

Having thus described the invention, what is claimed as new is:

1. A stop-leak composition for the cooling system of an internal combustion engine and the like consisting essentially of ginger rhizome flour, ground nut shells, boric acid powder, sodium lignin sulfonate powder and magnesium stearate.

2. The stop-leak composition of claim 1 consisting essentially of said ginger rhizome flour and said nut shell powder finely ground and mixed in proportions of substantially 50 to 75% by weight of said ginger rhizome flour, with an addition of about 1.5 to 3.5% by weight of said boric acid powder, 3 to 6% by weight of said sodium lignin sulfonate powder and 0.5 to 2% by weight of said magnesium stearate.

3. A method of obtaining a stop-leak composition comprising the steps of: finely grinding nut shells, finely separately grinding ginger rhizomes, thoroughly mixing said ground nut shells and said ground ginger rhizomes, and adding a binder consisting essentially of boric acid, sodium lignin sulfonate powder and magnesium stearate.

4. The method of claim 3 further comprising the step of forming dry pellets of said composition by compaction at a pressure of at least 2 tons per square inch (140 kg/cm$^2$).

5. The method of claim 4 wherein said nut shells and said ginger rhizomes are ground to a particle size capable of passing through a No. 30 mesh screen and said dry pellets are formed by compaction at a pressure between 20 tons per square inch (1,400 kg/cm$^2$) and 40 tons per square inch (2,800 kg/cm$^2$).

6. The method of claim 5 wherein the proportions by weight of said ginger rhizomes, boric acid powder, sodium lignin sulfonate powder, magnesium stearate and ground hardwood nut shells are respectively 50 to 75%, 1.5 to 3.5%, 3 to 6%, 0.5 to 2% and the balance.

* * * * *